United States Patent [19]

Malec et al.

[11] 3,883,501

[45] May 13, 1975

[54] SULFURIZED PHENOLIC MATERIALS

[75] Inventors: Robert E. Malec, Birmingham; Larry Plonsker, Bloomfield Hills, both of Mich.

[73] Assignee: Ethyl Corporation, Richmond, Va.

[22] Filed: Sept. 19, 1973

[21] Appl. No.: 398,644

[52] U.S. Cl. ............ 260/137; 260/125; 260/609 F; 252/48.2; 260/608
[51] Int. Cl. ............................................ C07g 17/00
[58] Field of Search ......... 260/137, 608, 609 F, 137

[56] References Cited
UNITED STATES PATENTS
1,194,201  8/1916  McCoy .............................. 260/137
2,506,902  5/1950  Smith et al ........................ 260/137

*Primary Examiner*—Lewis Gotts
*Assistant Examiner*—D. R. Phillips
*Attorney, Agent, or Firm*—Donald L. Johnson; Robert A. Linn; Joseph D. Odenweller

[57] ABSTRACT

Organic material is stabilized by addition of a sulfurized product made by heating a mixture of (a) sulfur and (b) a reaction product formed by reacting in the presence of an alkali metal hydroxide catalyst (i) a mixture of at least two different alkylphenols, each having an unsubstituted ortho and/or para position, and (ii) formaldehyde. Preferably, the reaction product is formed in the presence of a small amount of primary lower alkanol such as methanol. When added to lubricating oil the sulfurized products also impart wear and corrosion inhibiting properties.

10 Claims, No Drawings

SULFURIZED PHENOLIC MATERIALS

BACKGROUND

Phenolic antioxidants have been used to stabilize a broad range of organic materials. For example, Coffield et al, U.S. Pat. No. 2,944,086, discloses the use of methylenebis (dialkylphenols) as antioxidants. Likewise, sulfur-bridged phenols have been used as antioxidants. These are made by reacting alkylphenols with sulfur halides (Coffield, U.S. Pat. No. 3,069,384).

SUMMARY

According to the present invention, new antioxidants are provided by heating a mixture of sulfur with a mixture of methylenebisphenols formed by reacting a mixture of alkylated phenols with formaldehyde using a base catalyst and, optionally, an aliphatic primary alkanol. When used in lubricating oil the new additives impart improved wear and corrosion inhibiting properties in addition to being effective antioxidants.

DESCRIPTION OF THE PREFERRED EMBODIMENTS

A preferred embodiment of this invention is a sulfurized product made by the process comprising heating to a temperature of about 50°–200°C. a mixture of (a) about 0.5–10 parts by weight of sulfur and (b) about 100 parts by weight of a reaction product made by reacting in the presence of an alkali metal hydroxide catalyst (i) 1 mole part of a mixture of alkylphenols containing at least two different alkylphenols, each of said different alkylphenols having a hydrogen atom available in an ortho or para position, at least one of said different alkylphenols having a tert-alkyl group in an ortho position, and (ii) from about 0.3 to about 10 mole parts of formaldehyde per equivalent of said alkylphenols.

The initial reaction product that is mixed with sulfur and heated to form the sulfur product can be made by known methods. Its preparation is described in Hinkamp, U.S. Pat. No. 3,211,652, incorporated fully herein by reference.

The initial reaction product comprises a mixture of methylenebisphenols containing (1) at least one symmetrical methylenebisphenol of the formula:

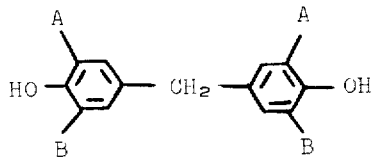

wherein A is a tert-alkyl group having 4 to about 12 carbon atoms and B is selected from the group consisting of hydrogen and alkyl groups containing from 1–12 carbon atoms; and (2) at least one asymmetrical methylenebisphenol having different phenol radicals and having at least one ortho-tert alkyl group of from 4 to 12 carbon atoms.

The initial reaction product may be formed by mixing individual symmetrical and asymmetrical methylenebis alkylphenols. It is preferred that the initial reaction product be formed by reacting in the presence of an alkali metal hydroxide catalyst (i) 1 mole part of a mixture of alkylphenols containing at least two different alkylphenols, each of said different alkylphenols having a hydrogen atom available in an ortho or para position, at least one of said different alkylphenols having a tert-alkyl group in an ortho position, and (ii) from about 0.3 to about 10 mole parts of formaldehyde per equivalent of said alkylphenol.

Examples of suitable alkylphenols having an unsubstituted ortho and/or para position that can be used to prepare the initial reaction product include:

2-tert-butylphenol
2,6-di-tert-butylphenol
2,4-di-tert-butylphenol
4-tert-butylphenol
2-isopropylphenol
2,6-diisopropylphenol
2,4-diisopropylphenol
2-sec-butylphenol
2,6-di-sec-butylphenol
2,4-di-sec-butylphenol
2-tert-hexylphenol
2,6-di-tert-hexylphenol
2-tert-butyl-p-cresol
2-tert-butyl-o-cresol
2-tert-dodecylphenol
2-tert-dodecyl-p-cresol
2-tert-decyl-o-cresol
2-tert-butyl-6-isopropylphenol To prepare the initial reaction product one selects at least two different alkylphenols each having a hydrogen atom available at an ortho and/or para position and at least one of which has an ortho-tert-alkyl substituent containing from 4 to about 12 carbon atoms. This alkylphenol mixture is reacted with formaldehyde to form a mixture of symmetrical and asymmetrical methylenebis alkylphenols.

The make-up of the mixtures of the phenols employed in preparing the initial reaction product can vary over a wide range. Thus, as high as 93–94 mole per cent of a first phenol and 6–7 mole per cent of a second phenol may be used. Generally, at least 10 per cent of a phenolic compound having a hydrogen in the ortho or para position, or both, and a tertiary alkyl group of from 4–12 carbon atoms ortho to the hydroxyl group is employed. Thus, mixtures of from about 10–50 per cent of a first phenol and 50–90 per cent of a second phenol are very useful in preparing the initial reaction product.

In a more preferred embodiment the alkylphenol mixture comprises a mixture of tert-alkyl-substituted phenols such as a mixture of two or more of the following:

o-tert-butylphenol
2,6-di-tert-butylphenol
2,4-di-tert-butylphenol
o-tert-amylphenol
2,6-di-tert-amylphenol
2,4-di-tert-amylphenol
o-tert-hexylphenol
2,6-di-tert-hexylphenol
2,4-di-tert-hexylphenol
o-tert-dodecylphenol
2,6-di-tert-dodecylphenol
2,4-di-tert-dodecylphenol In a highly preferred embodiment the alkylphenol mixture comprises a mixture of tert-butylphenols. In such mixtures it is preferred that one of the phenols is 2,6-di-tert-butylphenol. Preferably, the mixture contains at least 50 weight per cent 2,6-di-tert-butylphenol and 5–30 weight per cent 2-tert-butylphenol. Other constituents can include about 3–15 weight per cent 2,4,6-tri-tert-butylphenol and small amounts of 2,4-di-tert-butylphenol. Since 2,4,6-tri-tert-butylphenol does not contain a reactive ortho or para hydrogen it does not enter into the initial reaction to form the mixture of methylenebis alkylphenols but its presence in the resulting reaction product is not detrimental and, in fact, contributes to the overall effectiveness of the final sulfurized product.

In an especially preferred embodiment the mixture of phenols employed is that obtained in an orthoalkylation reaction as described in Ecke et al., U.S. Pat. No. 2,831,898, incorporated herein by reference. In this reaction a mixture consisting mainly of 2-tert-butylphenol, 2,6-di-tert-butylphenol and 2,4,6-tri-tert-butylphenol is obtained by alkylating phenol with isobutylene using an aluminum phenoxide catalyst. Preferably, the alkylphenol mixture contains 50–90 weight per cent 2,6-di-tert-butylphenol, 5–30 weight per cent 2-tert-butylphenol and about 3–15 weight per cent 2,4,6-tri-tert-butylphenol.

The initial reaction is readily carried out by mixing formaldehyde with the mixture of alkylphenols and heating the mixture to reaction temperature in the presence of a base catalyst such as an alkali metal hydroxide, for example, lithium hydroxide, sodium hydroxide or potassium hydroxide.

The amount of formaldehyde should be an amount sufficient to form a substantial number of methylene bridging groups. This amount is expressed in terms of moles of formaldehyde per reactive phenol equivalents. The reactive phenol equivalent is determined by multiplying the moles of each individual phenol by the number of open ortho and/or para positions in such phenol. For example, 1 mole of 2-tert-butylphenol represents two reactive phenol equivalents. Likewise, one mole of 2,6-di-tert-butylphenol represents one reactive phenol equivalent, and 1 mole of 2,4,6-tri-tert-butylphenol represents zero reactive phenol equivalents. Preferably, there should be used at least 0.3 mole of formaldehyde per reactive phenol equivalent. A useful range is from about 0.3 to 10 moles of formaldehyde per reactive phenol equivalent, although an amount in excess of this can be used.

The amount of base catalyst should be sufficient to cause the formation of methylene bridges at a reasonable rate. A useful range is from about 0.01 to 0.25 mole of base per mole of alkylphenol. A preferred range is from 0.02 to 0.1 mole of base per mole of alkylphenol. The preferred base catalysts are sodium hydroxide and potassium hydroxide.

The initial reaction to form the mixture of symmetrical and asymmetrical methylenebis alkylphenols can be carried out with or without a solvent. Preferably a solvent is used. Useful solvents include the secondary and tertiary alkanols such as isopropanol, sec-butanol and tert-butanol.

The initial reaction should be conducted at a temperature high enough to promote the reaction. A useful range is from 50° to about 200°C. When a solvent is used it is convenient to conduct the initial reaction at the reflux temperature of the solvent. With isopropanol this is around 86°C.

In a highly preferred embodiment the initial reaction is carried out in the presence of an aliphatic primary lower alkanol. The presence of this primary alcohol tends to provide a more liquid final product by introducing alkoxymethyl groups into the alkylphenols. More useful primary alcohols are those containing one to about 4 carbon atoms such as methanol, ethanol, n-propanol, n-butanol, and isobutanol. Of these, methanol is most preferred.

Only a small amount of aliphatic primary lower alkanol need be used to obtain excellent results. A useful range is from about 0.03 to 3.0 mole parts per each mole part of alkylphenol. A preferred range is from about 0.03 to 0.3 mole parts per mole part of alkylphenol. Alternatively, the initial reaction can be conducted using a primary aliphatic alcohol solvent such as ethanol.

The following examples serve to illustrate the preparation of typical initial reaction products. All parts are by weight unless otherwise stated.

EXAMPLE 1

A mixture of 75 weight per cent of 2,6-di-tert-butylphenol, 15 weight per cent ortho-tertiary butylphenol and 10 weight per cent of 2,4,6-tri-tert-butylphenol was reacted with paraformaldehyde in the presence of ethanol. The following amounts of reactants were employed:

724 parts of phenol mixture
20 parts of potassium hydroxide
76 parts of paraformaldehyde
600 parts of 95 per cent ethanol The reaction was conducted at reflux (81°–83°C.) for 2 hours after which time the mixture was cooled to 70°C. and neutralized with glacial acetic acid. The alcohol was stripped under vacuum beginning at 70°C. and ending at 35°C. and 10 mm. pressure. The residue was then dried with 1400 parts of benzene and washed three times in 750 parts aliquots of water, dried and the benzene was removed by vacuum distillation. The reaction product, a viscous oil, was found to be completely soluble and miscible with a hydrocarbon lubricating oil at up to 20 per cent weight concentration. The reaction product contains 4,4'-methylenebis-(2,6-di-tert-butylphenol), (3,5-di-tert-butyl-4-hydroxyphenyl)-(3-tert-butyl-2-hydroxyphenyl)-methane and (3,5-di-tert-butyl-4-hydroxyphenyl)-(3-tert-butyl-4-hydroxyphenyl)-methane as major components. In addition, the reaction mixture contains numerous other possible condensation products of 2,6-di-tert-butylphenol and o-tert-butylphenol such as 4,4'-methylenebis(2-tert-butylphenol), 2,2'-methylenebis(6-tert-butylphenol), (3-tert-butyl-2-hydroxyphenyl)-(3-tert-butyl-4-hydroxyphenyl)-methane, 3-tert-butyl-4-hydroxybenzyl ethyl ether, 3-tert-butyl-2-hydroxybenzyl ethyl ether, the derivative of o-tert-butylphenol having ethyl ether substituents on methyl groups ortho and para to the hydroxyl groups, and various molecular weight polymers of the substituents present having open reactive ortho or para positions.

EXAMPLE 2

In a reaction vessel was placed 200 parts of isopropanol, 3.7 parts of methanol, 9.5 parts of KOH and 270 parts of an alkylphenol mixture consisting essentially of 68 weight per cent 2,6-di-tert-butylphenol, 22 weight per cent o-tert-butylphenol and 7 weight per cent 2,4,6-tri-tert-butylphenol plus minor amounts of other alkylphenols. The mixture was stirred at 60°C. and 37.5 parts of paraformaldehyde added. It was then heated to reflux (ca. 85°C.) and stirred at reflux for 2 hours. Then 23.5 parts of acetic acid was added and isopropanol distilled out up to a liquid temperature of 120°C. Following this, 430 parts of toluene was added and the resultant solution washed 4 times with 1220 parts each of water. Toluene was distilled out up to a liquid temperature of 130°C. at 120 mm Hg.

Other initial reaction products comprising mixtures of symmetrical and asymmetrical methylenebis alkylphenols can be prepared following the above general procedure and those set forth in U.S. Pat. No. 3,211,652.

The sulfurized product can be prepared by merely mixing elemental sulfur with the initial reaction product and heating the mixture to a temperature sufficient to cause sulfurization. In general, a temperature of about 50°–250°C. is satisfactory, and a preferred temperature range is from about 120° to 180°C.

The amount of sulfur used can vary widely. A useful range is from about 0.5–10 parts by weight of sulfur for each 100 parts by weight of initial reaction product. A preferred range is about 2–5 parts of sulfur per 100 parts of initial reaction product. An amount in excess of this can be used and any unused portion removed by such means as filtration or centrifugation.

The following examples illustrate the preparation of the sulfurized product.

EXAMPLE 3

In a reaction vessel was placed 97 parts of the initial reaction product from Example 2, 100 parts of neutral mineral oil diluent and 3 parts of sublimed sulfur. The mixture was stirred and heated under a nitrogen atmosphere at 150°–165°C. for 30 minutes. The resultant sulfurized product was a clear yellow viscous liquid.

EXAMPLE 4

The procedure of Example 3 was repeated using 94 parts of the initial reaction product of Example 2 and 6 parts of sulfur.

EXAMPLE 5

The procedure of Example 3 was repeated using 98 parts of the reaction product from Example 2 and 2 parts of sulfur.

EXAMPLE 6

The procedure of Example 3 was repeated except that the mixture was stirred for 1 hour at 150°–165°C.

The sulfurized products of this invention are effective stabilizers in a broad range of organic materials of the type normally subject to oxidative deterioration in the presence of oxygen during use over an extended period. In other words, the organic compositions protected by the present antioxidants are the type in which the art recognizes the need for antioxidant protection and to which an antioxidant of some type is customarily added to obtain an extended service life. The oxidative degradation protected against is the slow gradual deterioration of the organic composition rather than, for example, combustion. In other words, the present additives are not flame retarding additives nor flame suppressing additives and the degradation protected against is not combustion but, rather, the gradual deterioration of the organic composition due to the effects of oxygen over an extended period of time.

Examples of organic materials in which the additives are useful include homopolymers and copolymers of olefinically unsaturated monomers, for example, polyolefins such as polyethylene, polypropylene, polybutadiene, and the like. Also, poly-halohydrocarbons such as polyvinyl chloride, polychloroprene, polyvinylidene chloride, polyfluoro olefins, and the like, are afforded stabilization. The additives provide both antioxidant and antiozonant protection in natural and synthetic rubbers such as copolymers of olefinically unsaturated monomers including styrene-butadiene rubber (SBR rubber), ethylene-propylene copolymers, ethylene-propylene-diene terpolymers such as the terpolymer of ethylene, propylene and cyclopentadiene or cyclooctadiene. Polybutadiene rubbers such as cis-polybutadiene rubber are protected. Poly-2-chloro-1,3-butadiene (neoprene) and poly-2-methyl-1,3-butadiene (isoprene rubber) are stabilized by the present additives. Likewise, acrylonitrile butadiene-styrene resins are effectively stabilized. Ethylene-vinyl acetate copolymers are protected, as are butene-methylacrylate copolymers. Nitrogen-containing polymers such as polyurethanes, nitrile rubber, and lauryl acrylate-vinylpyrolidone copolymers are effectively stabilized. Adhesive compositions such as solutions of polychloroprene (neoprene) in toluene are protected. Fats and oils of animal and vegetable origin are protected against gradual deterioration. Examples of these are lard, beef tallow, coconut oil, safflower oil, castor oil, babassu oil, cottonseed oil, corn oil, rapeseed oil, and the like.

Petroleum oils and waxes such as solvent-refined midcontinent lubricating oil, microcrystalline wax, and gulf-coast lubricating oils are effectively stabilized. Animal feeds such as ground corn, cracked wheat, oats, wheat germ, alfalfa, and the like, are protected by mixing a small but effective amount of the present additives with these products. Vitamin extracts, especially the fat-soluble vitamins such as Vitamins A, B, D, E and C, are effectively stabilized against degradation. The additives are useful in foamed plastics such as expanded polystyrene, polyurethane foams, and the various foamed rubbers, alkyd resins such as short oil terephthalic acid-glycerol-linseed oil resins, and typical long oil resins of trimellitic acid-glycol-tung oil resins including epoxide-modified alkyl resins. Epoxy resins themselves such as isopropylidenebisphenol-epichlorohydrin epoxy resins are stabilized against degradation.

Hydrocarbons such as gasoline, kerosene, diesel fuel, fuel oil, furnace oil, and jet fuel are effectively protected. Likewise, synthetic hydrocarbon lubricants, for example, α-decene trimer, polybutene lubricants, di- and tri-$C_{12-30}$ alkylated benzene and naphthalene synthetic lubricants are likewise protected.

Organometallics such as tetraethyllead, tetramethyllead, tetravinyllead, ferrocene, methyl ferrocene, cyclopentadienyl manganese tricarbonyl, methyl cyclopentadienyl manganese tricarbonyl, cyclopentadienyl nickel nitrosyl, and the like, are effectively protected against oxidative degradation. Silicone oils and greases are also protected.

Synthetic ester lubricants such as those used in turbines and turbojet engines are given a high degree of stabilization. Typical synthetic ester lubricants include di-2-ethylhexyl sebacate, trimethylolpropane tripelargonate, $C_{5-9}$ aliphatic monocarboxylic esters of pentaerythritol, complex esters formed by condensing under esterifying conditions mixtures of polyols, polycarboxylic acids, and aliphatic monocarboxylic acids and/or monohydric alkanols. An example of these complex esters is the condensation product formed from adipic acid, ethyleneglycol and a mixture of $C_{5-9}$ aliphatic monocarboxylic acids. Plasticizers such as dioctyl phthalate are effectively protected. Heavy petroleum fractions such as tar and asphalt can also be protected should the need arise.

Polyamides such as adipic acid-1,6-diaminohexane condensates and poly-6-aminohexanoic acid (nylon) are effectively stabilized. Polyalkylene oxides such as copolymers of phenol with ethylene oxide or propylene oxide are stabilized. Polyphenyl ethers such as poly-2,6-dimethylphenyl ether formed by polymerization of 2,6-dimethylphenol using a copper-pyridine catalyst are stabilized. Polycarbonate plastics and other polyformaldehydes are also protected.

Linear polyesters such as phthalic anhydride-glycol condensates are given a high degree of protection. Other polyesters such as trimellitic acid-glycerol condensates are also protected. Polyacrylates such as polymethylacrylate and polymethylmethacrylate are effectively stabilized. Polyacrylonitriles and copolymers of acrylonitriles with other olefinically unsaturated monomers such as methylmethacrylates are also effectively stabilized.

The additives can be used to protect any of the many organic substrates to which an antioxidant is normally added. It can be used where economics permit to protect such substrates as asphalt, paper, fluorocarbons such as teflon, polyvinyl acetate, polyvinylidene chloride, coumarone-indene resins, polyvinyl ethers, polyvinylidene bromide, polyvinyl bromide, acrylonitrile, vinyl bromide copolymer, vinyl butyral resins, silicones such as dimethylsilicone lubricants, phosphate lubricants such as tricresylphosphate, and the like.

The additives are incorporated into the organic substrate in a small but effective amount so as to provide the required antioxidant protection. A useful range is from about 0.01 to about 5 weight per cent, and a preferred range is from about 0.1 to 3 weight per cent.

Methods of incorporating the additive into the substrate are well known. For example, if the substrate is liquid the additive can be merely mixed into the substrate. Frequently the organic substrate is in solution and the additive is added to the solution and the solvent removed. Solid organic substrates can be merely sprayed with a solution of the additive in a volatile solvent. For example, stabilized grain products result from spraying the grain with a toluene solution of the additive. In the case of rubbery polymers the additive can be added following the polymerizstion stage by mixing it with the final emulsion or solution polymerization mixture and then coagulating or removing solvent to recover the stabilized polymer. It can also be added at the compounding stage by merely mixing the additive with the rubbery polymer in commercial mixing equipment such as a Banbury blender. In this manner, rubbery polymers such as styrene-butadiene rubber, cis-polybutadiene or isoprene polymers are blended with the antioxidant together with the other ingredients normally added such as carbon black, oil, sulfur, zinc oxide, stearic acid, vulcanization accelerators, and the like. Following mastication, the resultant mixture is fabricated and molded into a finished form and vulcanized. The following will serve to illustrate the manner in which the additives are blended with various organic substrates.

EXAMPLE 7

To a synthetic rubber master batch comprising 100 parts of SBR rubber having an average molecular weight of 60,000, 50 parts of mixed zinc propionate stearate, 50 parts of carbon black, 5 parts road tar, 2 parts sulfur and 1.5 parts of mercapto benzothiazole is added 1.5 parts of the additive of Example 3. After mastication, the resultant master batch is cured for 60 minutes using 45 psi steam pressure, resulting in a stabilized SBR vulcanizate.

EXAMPLE 8

A synthetic SBR polymer is prepared by polymerizing 60 per cent styrene and 40 per cent butadiene in an aqueous emulsion employing a sodium oleate emulsifier and a peroxide catalyst. Following this, sufficient additive of Example 4 is added to provide 0.3 weight per cent, based upon the SBR polymer. The emulsion is then coagulated using an acidified salt solution and the coagulated polymer compressed into bales for storage. The polymer is stable during storage and can later be compounded to prepare SBR vulcanizates.

EXAMPLE 9

One part of the additive of Example 5 is blended with 100 parts of raw butyl rubber prepared by the copolymerization of 90 per cent isobutylene and 10 per cent isoprene, resulting in a stable elastomer.

EXAMPLE 10

A cis-polybutadiene polymer is prepared having 90 per cent cis configuration by polymerizing butadiene in a toluene solvent employing a diethyl aluminum chloride-cobalt iodide catalyst. Following the polymerization, a small amount sufficient to provide 0.2 weight per cent of the additive of Example 6 is added to the toluene solution, following which the solution is injected into boiling water together with steam causing the solvent to distill out and the cis-polybutadiene to coagulate, forming a rubber crumb. The crumb is dried and compressed into bales, resulting in a stabilized cis-polybutadiene.

EXAMPLE 11

A butadiene-acrylonitrile copolymer is prepared from 1,3-butadiene and 32 per cent of acrylonitrile. One percent, based on the weight of polymer, of the additive of Example 3 is added as an emulsion in a sodium oleate solution. The latex is coagulated and the coagulum is washed and dried, resulting in a stabilized butadiene-acrylonitrile copolymer.

EXAMPLE 12

To 1,000 parts of a solid polypropylene powder is added 5 parts of the additive of Example 4 and 10 parts of dilaurylthiodipropionate. The mixture is heated to its melting point and rapidly stirred and extruded to form a useful polypropylene filament.

EXAMPLE 13

To 1,000 parts of polyethylene is added 3 parts of the additive of Example 5 and 5 parts of dilaurylthiodipropionate. The mixture is heated to its melting point and stirred and then passed through an extruder having a central mandrel to form tubular polyethylene which is inflated to form a useful polyethylene film.

EXAMPLE 14

To 100,000 parts of a midcontinent, solvent-refined mineral oil having a viscosity at 100°F. of 373.8 SUS and at 210°F. of 58.4 SUS is added 500 parts of the additive of Example 6. Following this is added 100 parts of a zinc dialkyldithiophosphate, 50 parts of an overbased calcium alkaryl sulfonate, 1,000 parts of a poly dodecylmethacrylate V.I. improver and 2,000 parts of a 70 per cent active oil solution of an alkenyl succinimide of tetraethylenepentamine in which the alkenyl group has a molecular weight of 950. The resultant mixture is blended while warm, following which it is filtered and packaged, giving a stable lubricating oil useful in automotive engines.

EXAMPLE 15

To 10,000 parts of a dimethyl silicone lubricating oil is added 50 parts of the additive of Example 3. The mixture is stirred at 50°C. until thoroughly blended, resulting in a stable silicone lubricating oil.

EXAMPLE 16

To 10,000 parts of corn oil is added 15 parts of the additive of Example 4. The mixture is stirred, giving a corn oil highly resistant to normal oxidative degradation.

EXAMPLE 17

To 10,000 parts of trimethylolpropane tripelargonate is added 200 parts of tricresylphosphate, 10 parts of dimethyl silicone, 10 parts of benzothiazole, 50 parts of phenyl-β-naphthyl amine, and 50 parts of the additive of Example 5, resulting in a stabilized synthetic ester lubricant.

EXAMPLE 18

Wax paper is made by impregnating paper with paraffin wax containing 0.05 weight per cent of a mixture of the additive of Example 6. The wax paper is used to make containers for potato chips which results in chips having extended shelf life.

EXAMPLE 19

To 10,000 parts of gasoline having an 87 R.O.N. is added 20 parts of the additive of Example 3 and sufficient commercial tetraethyllead antiknock fluid to provide 2.5 grams of lead per gallon, resulting in a stabilized gasoline having a 96 R.O.N.

EXAMPLE 20 To 10,000 parts of 41 cetane diesel fuel is added 50 parts of hexyl nitrate and 25 parts of the additive of Example 4, providing a stable diesel fuel.

EXAMPLE 21

To 10,000 parts of melted lard is added 10 parts of the additive of Example 5 and the mixture is stirred until thoroughly blended, resulting in a lard highly resistant to normal oxidative degradation.

From the foregoing, it should be apparent how to prepare stable organic compositions using the additives of this invention.

Tests were carried out in mineral lubricating oil to measure the wear inhibiting properties of the sulfurized product compared to the unsulfurized initial reaction product. These were four-ball wear tests in which the central ball of a four-ball pyramid is rotated under a 50 Kg load for 1 hour against the three stationary balls. The balls are lubricated with mineral oil at 110°C. containing the test additive. The rotating ball causes a circular scar to form on the three fixed balls. The average diameter of this scar is a measure of the amount of wear. Results obtained using lubricants containing the present sulfurized products compared to the unsulfurized initial reaction products are shown in the following table.

| Additive | Conc. (wt. %) | Scar Diameter (mm) |
| --- | --- | --- |
| Example 2 | 0.75 | 2.51 |
| Example 2 | 1.50 | 2.65 |
| Example 3 | 1.5 | 0.94 |
| Example 3 | 3.0 | 0.91 |
| Example 4 | 1.5 | 0.99 |
| Example 4 | 3.0 | 1.03 |
| Example 5 | 3.0 | 1.71 |
| Example 6 | 3.0 | 0.92 |

The above results testify to the exellent wear inhibiting properties of the present sulfurized products. The additives of Examples 3-6 significantly reduced the amount of wear compared to that obtained with the non-sulfurized reaction product of Example 2.

Further tests were carried out to determine the antioxidant effectiveness of the sulfurized product. In these tests 100 ml mineral oil samles were prepared and a clean, weighed copper-lead bearing placed in each sample. The test additive was added and the oil maintained at 325°F. for 96 hours while bubbling air through it at a rate of 48 l/hour. At the end of this time the amount of sludge formed was rated visually and the bearing weighed to determine bearing weight loss. The results obtained with the sulfurized product compared to the unsulfurized initial reaction product of Example 2 and a nonadditive control were as follows:

| Additive | Conc. (wt. %) | Bearing Wt. Loss (mg) | Sludge Rating |
| --- | --- | --- | --- |
| None | — | 28 | C |
| Example 2 | 1.0 | + 5[1] | C |
| Example 3 | 2.0 | + 6 | A[2] |
| Example 5 | 2.0 | + 5 | A |
| Example 6 | 2.0 | + 7 | A |

[1]Small weight gain
[2]"A" is no sludge

In the above table the concentration of additives of Examples 3, 5 and 6 was the same as that of Example 2 because the additive of Examples 3, 5 and 6 is diluted with oil to 50 per cent active ingredient. The results show that the sulfurized product retained the excellent antioxidant effectiveness of the initial reaction product and, in fact, had a cleaner sludge rating.

The lubricating oil compositions are prepared by blending a sulfurized product of this invention with lubricating oil including both synthetic oils and mineral oils. Suitable synthetic oils include synthetic esters such as esters of alkanols and alkane polyols (pentaerythritol, trimethylolpropane, and the like), complex esters made using mono- and poly-carboxylic acids and mono- and poly-hydroxy alkanols, polyolefin oils such as liquid polybutene, silicon oils, silicate esters, polyphenylene oxide oils, and the like. Preferably the oil is a mineral lubricating oil. The amount of sulfurized product should be an amount adequate to impart the desired degree of antiwear and antioxidant properties. Good results can be obtained using from 0.1 to about 5 weight per cent. A preferred range is from 0.3 to about 3 weight per cent.

Other additives normally added to lubricating oil can be included in the formulated oil. These include metal sulfonates such as calcium alkarylsulfonates and magnesium alkarylsulfonates, zinc dialkyldithiophosphates, antioxidants such as 4,4'-methylenebis(2,6-di-tert-butylphenol), viscosity index improvers such as poly-laurylmethacrylates, polybutenes and ethylenepropylene copolymers. Likewise, metal phenates such as barium or zinc alkylphenates or sulfur-bridged metal phenates may be included. Phosphosulfurized hydrocarbons and their metal salts may be added such as the reaction product of $P_2S_5$ with terpenes or polybutenes and their barium salts. Ashless dispersants such as the high molecular weight (800–3000) alkylsuccinimides of ethylenepolyamines are very beneficial. Also, high molecular weight (800–3000) alkylphenol-formaldehyde-amine (e.g., N,N-dimethyl-1,3-propanediamine or tetraethylenepentamine) Mannich condensation products are useful dispersants in the lubricating oil compositions of this invention.

We claim:

1. A sulfurized product made by the process comprising heating to a temperature of about 50°–200°C a mixture of (a) about 0.5–10 parts by weight of sulfur, and (b) about 100 parts by weight of a reaction product, said reaction product comprising a major amount of a mixture of methylenebis phenols, said mixture comprising (1) a substantial amount of at least one symmetrical methylenebis phenol having identically substituted phenol radicals and having the formula:

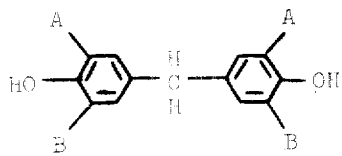

wherein A is a tert-alkyl group having from 4 to about 12 carbon atoms and B is selected from the group consisting of hydrogen and alkyl groups having 1–12 carbon atoms, and (2) a substantial amount of at least one asymmetrical methylenebis phenol having different phenol radicals and having at least one ortho-tert-alkyl group containing from 4–12 carbon atoms, said reaction product being made by reacting in the presence of an alkali metal hydroxide catalyst (i) one mole part of a mixture of alkyl phenols, said mixture containing at least two different alkyl phenols, each of said different alkyl phenols having a hydrogen atom available in an ortho or para position, said different alkyl phenols being selected from the group consisting of 2-alkyl phenols, 2,6-dialkyl phenols and 2,4-dialkyl phenols wherein said alkyl groups contain 1–12 carbon atoms, the remaining components of said mixture consisting mainly of 2,4,6-tri-alkyl phenol wherein said alkyl groups contain 1–12 carbon atoms, at least one of said different alkyl phenols having a tert-alkyl group containing 4–12 carbon atoms in an ortho position, and (ii) from about 0.3 to about 10 mole parts of formaldehyde per equivalent of said alkyl phenols.

2. A sulfurized product of claim 1 wherein said reaction product is formed in the presence of from about 0.03 to 3.0 mole parts of a primary lower aliphatic alcohol containing 1 to about 4 carbon atoms.

3. A sulfurized product of claim 1 wherein said mixture of alkylphenols comprises a mixture of tert-butylphenols.

4. A sulfurized product of claim 3 wherein one of said different alkylphenols is 2,6-di-tert-butylphenol.

5. A sulfurized product of claim 4 wherein one of said different alkylphenols is 2-tert-butylphenol.

6. A sulfurized product of claim 5 wherein said reaction product is formed in the presence of from about 0.03 to about 0.3 mole parts of a primary lower aliphatic alcohol containing 1 to about 4 carbon atoms.

7. A sulfurized product of claim 5 wherein said mixture of alkylphenols comprises about 50–90 weight per cent 2,6-di-tert-butylphenol and 5–30 weight per cent 2-tert-butylphenol.

8. A sulfurized product of claim 7 wherein said reaction product is formed in the presence of from about 0.03 to 0.3 mole parts of a primary lower aliphatic alcohol containing 1 to about 4 carbon atoms.

9. A sulfurized product of claim 8 wherein said primary lower aliphatic alcohol is methanol.

10. A sulfurized product of claim 9 wherein said mixture of alkylphenols consists mainly of about 50–90 weight per cent 2,6-di-tert-butylphenol, about 5–30 weight per cent 2-tert-butylphenol and about 3–15 weight per cent 2,4,6-tri-tert-butylphenol.

* * * * *